(12) United States Patent
Frey et al.

(10) Patent No.: US 7,032,981 B2
(45) Date of Patent: Apr. 25, 2006

(54) CONTROL SYSTEM FOR A VEHICLE

(75) Inventors: Gerhard Frey, Esslingen (DE); Harro Heilmann, Ostfildern (DE); Klaus-Dieter Holloh, Kernen (DE); Eilert Martens, Remshalden (DE); Christian Quinger, Schorndorf (DE); Andrewas Schwarzhaupt, Landau (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/065,447

(22) Filed: Feb. 25, 2005

(65) Prior Publication Data

US 2005/0231032 A1    Oct. 20, 2005

(30) Foreign Application Priority Data

Feb. 27, 2004    (DE) ...................... 10 2004 009 467

(51) Int. Cl.
*B60Q 1/00* (2006.01)
(52) U.S. Cl. ............................... 303/15; 303/3; 303/20; 340/439
(58) Field of Classification Search .................... 303/3, 303/7, 15, 20; 340/439, 436; 180/271, 402; 701/29
See application file for complete search history.

(56) References Cited

U.S. PATENT DOCUMENTS 6,092,879 A * 7/2000 Kornhaas et al. ...... 303/122.04
6,223,114 B1 * 4/2001 Boros et al. .................. 701/70
6,665,596 B1 * 12/2003 Bauer et al. .................. 701/33
6,906,623 B1 * 6/2005 Bauer et al. ................ 340/439

(Continued)

FOREIGN PATENT DOCUMENTS

| DE | 40 22 671 A1 | 7/1990 |
|---|---|---|
| DE | 196 01 795 A1 | 1/1996 |
| DE | 197 49 005 A1 | 11/1997 |
| DE | 198 53 628 A1 | 11/1998 |
| DE | 100 32 179 A1 | 7/2000 |

(Continued)

OTHER PUBLICATIONS

"Information from the BMW Group—2002" "The Physics of Driving".*

*Primary Examiner*—Christopher P. Schwartz
(74) *Attorney, Agent, or Firm*—Crowell & Moring LLP

(57) ABSTRACT

A control system for a vehicle having an electronically actuated drive train includes a coordination level which is assigned to a system control device, and in which setpoint values are generated from state variables (ZG) of the vehicle and from driver's requests. Actuation signals for actuating actuators are generated from the latter. An execution level, which is subordinate to the coordination level, has actuators for executing the actuation signals. An axle electronic module for activating at least one brake actuator which is assigned to the chassis is arranged in the region of the steerable vehicle axle. The axle electronic module is connected to the coordination level in order to receive transmittal setpoint values, and determines actuation signals for actuating the respective axle actuator from the setpoint values. The axle electronic module is connected to an electronically actuated steering system for transmitting the actuation signals.

7 Claims, 1 Drawing Sheet

U.S. PATENT DOCUMENTS

| | | | |
|---|---|---|---|
| 6,909,957 B1 * | 6/2005 | Suissa .......................... | 701/82 |
| 2003/0120401 A1 * | 6/2003 | Bauer et al. .................. | 701/29 |
| 2004/0026158 A1 * | 2/2004 | Rieth et al. .................. | 180/402 |
| 2004/0140147 A1 * | 7/2004 | Laurent ....................... | 180/402 |
| 2005/0001472 A1 * | 1/2005 | Bale et al. ................... | 303/20 |
| 2005/0067886 A1 * | 3/2005 | Nilsson et al. ............... | 303/20 |

FOREIGN PATENT DOCUMENTS

| | | |
|---|---|---|
| DE | 100 46 832 A1 | 9/2000 |
| EP | 0 754 611 A1 | 6/1996 |

* cited by examiner

CONTROL SYSTEM FOR A VEHICLE

BACKGROUND AND SUMMARY OF THE INVENTION

This application claims the priority of German patent document no. 10 2004 009 467.5, filed Feb. 27, 2004, the disclosure of which is expressly incorporated by reference herein.

The present invention relates to a control system for a vehicle.

German patent document DE 100 32 179 A1 discloses such a control system, which operates with an electronically actuated drive train that comprises at least a steering system, a brake system and a drive train of the vehicle. The system also includes an input level with the devices for inputting continuous values predefined by a driver and for converting the predefined values into setpoint value signals. A coordination level converts the setpoint value signals into actuation signals which are implemented by actuators of the drive train. In other words, the control system has a control device which generates output control signals for actuating the drive train, in response to an input movement vector. In order to transmit the control signals the control device is coupled to the drive train which then processes the control signals in order to implement the driver's request, referred to as a "drive-by-wire system" or an "X-by-wire system".

German patent document DE 100 46 832 A1 discloses a further vehicle control system which is equipped with an electronically actuated drive train. Vehicle data relating to vehicle movement dynamics, time, vehicle position, driver-end activation signals and actuation signals for the drive train which are generated by a control device are stored in a memory device.

Such a control system permits an improved analysis of accidents.

One object of the present invention is to provide an improved control system of the latter type which achieves rapid response and increased driving comfort.

This and other objects and advantages are achieved by the vehicle control system according to the invention, which is directed to a vehicle having an electronically actuated drive train, a coordination level, and an execution level which is subordinate to the coordination level. According to the invention, an axle electronic module which is designed to activate at least one brake actuator assigned to the chassis, is arranged near a steerable vehicle axle. The axle electronic module is connected here to axle actuators assigned both to the coordination level and to the vehicle axle, and receives setpoint values generated by the coordination level from driver's requests in order to determine actuation signals that actuate the respective axle actuator.

The control system according to the invention has at least two control levels. Specifically the coordination level (which is assigned to a control device and in which setpoint values are generated from state variables of the vehicle and from driver's requests) generates actuation signals for actuating actuators in response to the setpoint values. The execution level, which is subordinate to the coordination level and is assigned to the axle electronic module, has actuators for executing the actuation signals. It is significant that the axle electronic module i) is designed to activate at least one brake actuator assigned to the vehicle axle; ii) is arranged in the region of the steerable vehicle axle; iii) is connected to the coordination level in order to transmit setpoint values; iv) is designed to determine actuation signals for actuating the respective axle actuator from the setpoint values; and v) connected to an electronically actuated steering system for transmitting the actuation signals.

This means, that in contrast to previous control systems, the abovementioned axle-specific elements or systems are now controlled by the axle electronic module, while further actuators are actuated in a conventional manner with the control signals which are generated in the coordination level. The axle can also be checked functionally by actuating the sensors, actuators and the axle electronic module on or near the steerable axle.

The invention provides the advantage of integrating or bundling all the control processes for axle-specific actuators in the axle electronic module, and to that extent separating them from the conventional control system. The axle electronic module (which is arranged in the region of the steerable vehicle axle) is located in the direct vicinity of the axle actuators, so that the line paths between the axle actuators and the axle electronic module are significantly shortened in comparison with the previous embodiment. As a result, the cables required and the control times can thus also be reduced. In this manner, interconnection of the axle actuators to the axle electronic module is simplified, achieving advantages in cabling and of fabrication. At the same time, such an arrangement makes it possible to integrate at least part of a coordinating software package for actuating axle-specific functions (for example braking and/or steering) into the axle electronic module (and thus into the execution level).

Local arrangement of the sensors, actuators and axle electronic modules eliminates the variance of the line, and reduces the lengths of the lines and variants. In addition, it avoids installations which are defective from the very beginning.

The steering system can expediently be embodied as a steer-by-wire steering system and operate with a steering algorithm that can be modified as a function of the actuation signals. As a result, the electronically actuated steering system and brakes can be advantageously interconnected with one another, and both can be controlled as a function of acquired state variables (such as, for example, a lateral acceleration when cornering) and as a function of predefinable driver's requests.

In the coordination level, setpoint values for the brakes and for the steering system are generated from the driver's requests and the acquired state variables, and are transmitted (for example via a CAN bus system) to the local axle electronic system which transforms electrical actuation signals from the latter for the brakes and for the steering system. Predictive algorithms of the coordination level permit early detection of cornering in this context and adjust both the steering system and the brakes in an optimum way by means of corresponding actuation signals to the respective actuators. The vehicle movement dynamic state variables, mentioned previously, are sensed here by sensors and transferred to the axle electronic module.

The axle electronic module is expediently designed to control the at least one brake actuator and/or the controllable steering system and to take into account the "Kamm's Circle" (described hereinafter). That is, each tire can transmit only a certain maximum acceleration force and a certain maximum lateral guiding force to the road. If the tire is to transmit a maximum lateral guiding force, neither acceleration nor deceleration can occur; on the other hand, when there is a desired maximum acceleration force of the tire the tire cannot transmit any lateral guiding force at all to the road. When both forces occur, they maintain a relationship with each another that can be represented figuratively by means of the Kamm's Circle. In this context, the lateral guiding force is applied orthogonally with respect to the acceleration force and forms a force parallelogram of the two forces. The resulting force must not be greater than the radius of the Kamm's Circle here if it is desired to travel through the bend without danger. If the resulting force is greater than the radius of the Kamm's Circle, the centrifugal forces can become too large, so that the vehicle moves out of the curve.

The axle electronic module can expediently comprise electronics, software, and/or local control circuits for at least one of the following functions: braking, steering, additional drives, pitching and/or rolling, and controlling of a ride level. As a result, a large number of axle-specific or chassis-specific electronic and/or software components and/or control circuits are integrated into the axle electronic module and thus permit a rapid response to changing data, such as driver's requests and/or state variables of the vehicle. In addition, predictive algorithms, which permit optimum adjustment with respect to consumption and drive comfort, may be programmed in the coordinating software.

According to one advantageous embodiment of the invention, the electronics, software and/or local control circuit for the brake function controls at least one element from the following list: brake pressure, local ABS, ABS signal sensing and processing, active wear adjustment for a vehicle brake, and sensing of brake lining wear. This list is intended to show that the electronics, software, and/or local control circuit which controls the brake function has a plurality of subfunctions, a few of which have been mentioned above. The axle electronic module can thus sense and/or control a large number of axle-specific characteristic values. Further elements which can be controlled by the axle electronic module are, for example, a tire management system which calculates a coefficient of friction between the underlying surface and tires, a tire pressure sensor and further axle-related actuators.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic illustration of an embodiment of a control system according to the invention.

DETAILED DESCRIPTION OF THE DRAWINGS

Figure 1:
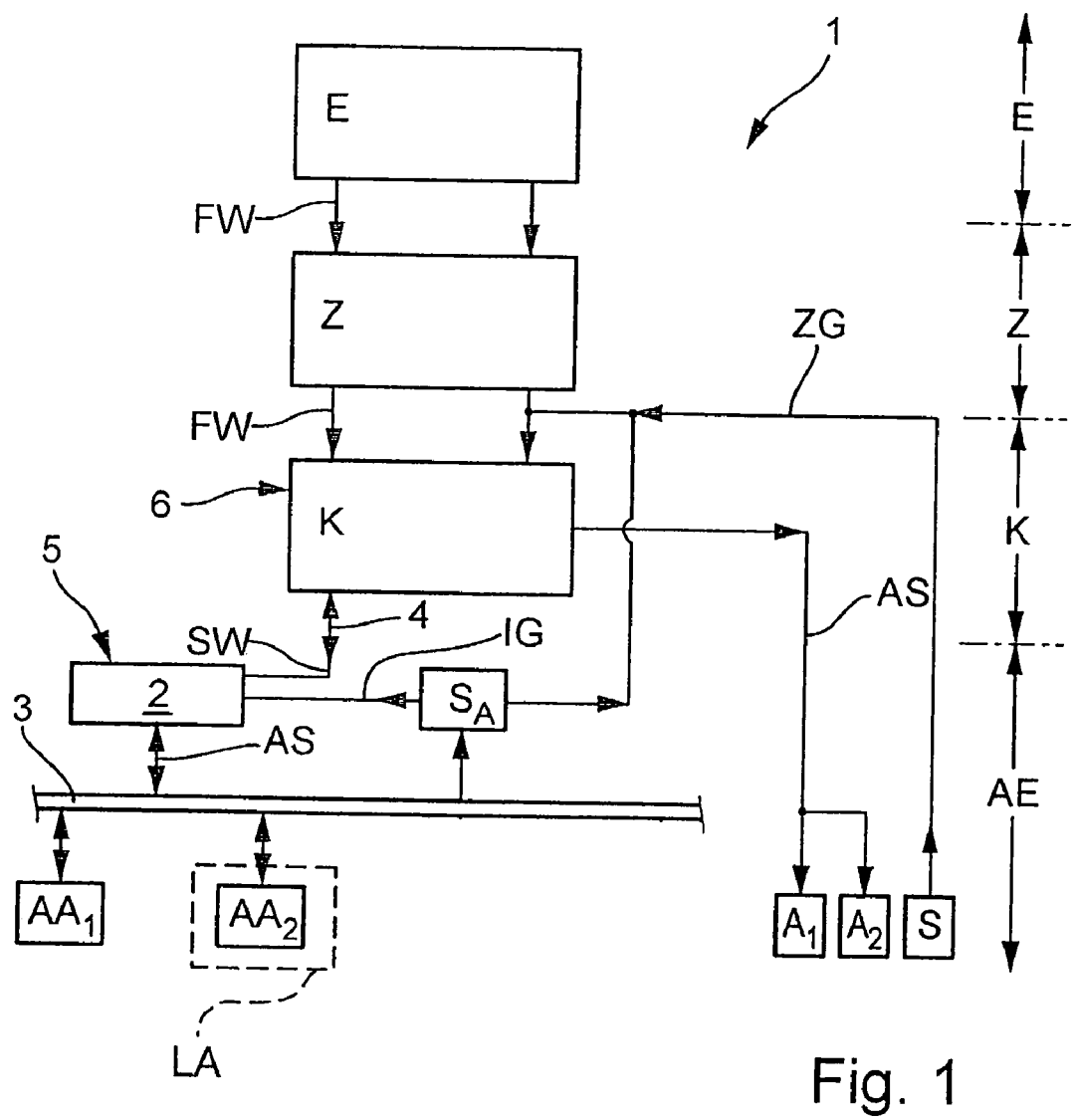

As shown in the FIGURE, a vehicle control system 1 according to the invention has a plurality of signal processing levels. By way of example, a total of four levels are represented here, specifically an input level E, an intermediate level Z, a coordination level K and an execution level AE which is subordinate or secondary to the coordination level K.

In the input level E, a driver inputs predefined values in the form of driver's requests FW by activating, for example, operator control elements such as, for example, an accelerator pedal, a brake pedal or a steering wheel or keeping them in a specific position. The inputs may be continuous or of a discrete type here.

Depending on the embodiment, the intermediate level Z may comprise either a single intermediate level Z or a plurality of levels (for example, a predictive level and/or a correction level). It is also possible for the coordination level K to be arranged directly after the input level E and for the driver's request FW to be transmitted directly from the input level E to the coordination level K.

In the coordination level K, which is assigned to a system control device 6, setpoint values SW are generated from state variables ZG of the vehicle and from the driver's requests FW, and actuation signals AS for actuating actuators A are generated from the latter. The vehicle movement dynamic state variables ZG (for example, lateral acceleration and steering angle) are transferred via a corresponding connection from sensors S of the vehicle and reflect the actual driving state of the vehicle. The actuation signals AS which are generated by the coordination level K control actuators A which are arranged in the execution level AE. The actuators A may include, for example, an actuator $A_1$ for a vehicle engine (not illustrated) and/or an actuator $A_2$ for a gearbox (not illustrated either). The execution level AE is arranged downstream of the coordination level K in terms of control technology.

According to the invention axle actuators AA (such as, for example, a brake actuator $AA_1$ and/or a steering actuator $AA_2$) are activated and/or controlled by an axle electronic module 2. The axle electronic module 2 is part of an axle control device 5 which is assigned to the execution level AE and is arranged in the region of the steerable vehicle axle 3. The axle actuators AA are assigned at least to a vehicle axle (the steerable vehicle axle 3 here). The axle electronic module 2 is connected to the coordination level K for transmitting setpoint values SW and is designed to determine actuation signals AS for actuating the respective axle actuator AA from the setpoint values SW. For the purpose of generating the actuation signals AS, the axle electronic module 2 receives, on the one hand, predefined setpoint values SW from the coordination level K as well as actual variables IG from one or more sensors $S_A$ which are designed to sense vehicle movement dynamic state variables ZG, in particular during cornering. In this context, the axle electronic module 2 activates the at least one brake actuator $AA_1$ if the state variables ZG reach a predetermined value. The setpoint values SW which are received at the input end of the axle electronic module 2 are generated in the coordination level K from the driver's requests FW and from state variables ZG.

The predetermined values at which the brake actuators $AA_1$ are activated are determined here on the basis of what is referred to as the Kamm's Circle which will be explained briefly below.

During any steering maneuver while the vehicle is moving, centrifugal forces occur which are opposed by the lateral guiding force of the tires, preventing the vehicle from leaving the roadway on a bend. Any tire can transmit only a specific maximum acceleration force and a specific maximum lateral guiding force. It is important to know that acceleration forces and lateral guiding forces have a direct relationship, which means that when both forces occur the individual forces can no longer act as well as when they occur alone. For this reason, a radius of the Kamm's Circle is formed by a resultant of the lateral guiding force and the acceleration force with which the vehicle can still just travel through the bend without leaving the roadway.

The radius of the Kamm's Circle is dependent on road-conditions here. In the case of rain or ice on the road the radius becomes smaller. If the resultant of the lateral guiding force and the acceleration force remains smaller than the radius of the Kamm's Circle, it is possible to travel through the bend without danger. However, if the magnitude of the resultant exceeds the magnitude of the radius of the Kamm's Circle, the vehicle leaves the road. Since the resultant is formed from the force parallelogram of the lateral guiding force and the acceleration force, an increase in the lateral guiding force with a constant resultant inevitably leads to a reduction in the acceleration force.

A tire which uses up all its adhesive force for lateral guidance in the bend therefore has no further reserves left for a positive or negative acceleration, leading to a situation in which, when a curve is traversed at the maximum possible speed, braking or accelerating inevitably causes the vehicle to leave the road.

In general, the axle electronic module 2 is designed to control the at least one brake actuator $AA_1$ and/or the controllable steering system LA, taking into account the "Kamm's Circle" explained above.

The actuation signals AS generated in the axle electronic module 2 control the assigned axle actuators AA. The exemplary sensor $S_A$, which generates actual variables IG for the axle electronic module 2, can additionally be connected to the coordination level K by other sensors S at the input end via a connecting line, and as a result transfer actual variables IG relating to a driving state both to the axle electronic module 2 and to the coordination level K.

The axle electronic module 2 can be connected to the coordination level K via a CAN bus 4, in which case it is also conceivable for further connections (for example between the axle actuators AA and the axle electronic module 2 and/or the sensors S and the input end of the coordination level K) to be embodied as CAN bus lines.

As a result of the interconnection via the CAN bus 4, at the same time it is easy, for example, to interconnect the brake and steering system LA, thus permitting rapid intervention in the respective steering situation.

Such intervention in a particular steering situation may be carried out, for example, in the case of a steer-by-wire steering system, by corresponding intervention in a steering algorithm. The steering algorithm can be modified as a function of the actuation signals AS so that, for example, a steering force and/or a steering transmission ratio can be adapted in an optimum way to the respective situation.

As shown in the FIGURE, the axle electronic module 2 is arranged near to the axle so that a control circuit between it, the axle actuators AA and the associated sensors $S_A$ is significantly shortened in comparison with the conventional control system. The invention thus helps reduce expenditures on cables and simplify the interconnection between individual axle actuators AA and the control system 1. According to the invention, the axle electronic module 2 carries out tasks which were originally located in the coordination level K, and have now been moved from there into the execution level AE by relocating the axle electronic module 2.

Arrangement of the sensors, actuators and of the axle electronic module 2 on the steerable axle 3 or in the vicinity of the axle, permit the axle to be checked functionally. The following checks are possible: electronic wiring, pneumatic piping, sensor system, actuator system, electronic system, hardware and software. This relates to the brake and to further functions. The characteristic curves of the sensors can be learned, and the starting values and end values therefore no longer need to be set manually. The axle can thus be supplied to the vehicle line in a completely checked and parameterized state as a premounted and pretested assembly.

As a result of the local arrangement of the sensors S, actuators A and axle electronic modules 2, the variance of the lines, both electrically and pneumatic, which is caused by the connection of the vehicle axle to different heights of vehicle frame is eliminated. As a result, the length of lines and variants are reduced. Installations which are defective from the very beginning are also avoided. A further advantage is the reduction of plug-type connections.

According to the invention, the axle electronic module 2 may comprise electronics, software, and/or local control circuits for, for example, brakes, pitching, rolling, and/or controlling a ride level. The electronics, software, and/or local control circuits for functions mentioned above can be implemented directly in situ in the electronic axle electronic module 2. An optimum result in terms of consumption and driving comfort can be obtained by means of predictive algorithms in the coordination level K and/or in the axle electronic module 2.

The electronics, software, and/or local control circuit for the braking function in the axle electronic module 2 are designed to control various elements such as, for example, brake pressure, a local ABS, an active wear adjustment means for the vehicle brakes or a means for sensing wear of the brake linings. This listing represents only a selection of possible elements, and does not purport to be complete.

Furthermore, the axle electronic module 2 can comprise electronics, software, and/or local control circuits for, for example, a tire management system, a tire pressure sensor or other axle-related actuators.

To summarize, the basic elements of the invention can be characterized as follows:

The invention provides, in the case of a control system 1 for a vehicle having an electronically actuated drive train, a coordination level K, and an execution level AE that is subordinate to the coordination level K, an axle electronic module 2 for activating at least one axle actuator AA which is assigned to a chassis, with the axle electronic module 2 being connected to the coordination level K in order to transmit setpoint values SW, and being designed to determine actuation signals AS for actuating the respective axle actuator AA from the setpoint values SW. The axle electronic module 2 is connected here to the axle actuators AA (for example to the brake actuators $AA_1$ and/or to the steering actuators $AA_2$) in order to transmit the actuation signals AS.

Sensors sense vehicle movement dynamic state variables ZG when cornering and transmit them to the axle electronic module 2. When a predetermined value of the state variables ZG has been reached, the axle electronic module 2 controls the at least one brake actuator $AA_1$ and/or a steering actuator $AA_2$ taking into account the Kamm's Circle, by influencing, for example, a steering algorithm of the steering system LA. Cornering is thus detected early and the behavior of the vehicle is optimally adjusted to the specific requirements. As a result, a high level of driving comfort and safety and a low level of consumption can be obtained.

In contrast to conventional control systems, in the control system 1 according to the invention, at least some of the software or the electronics are arranged in the axle electronic module 2, and are thus moved from the coordination level K into the execution level AE. As a result of the arrangement of the axle electronic module 2 near to the axle, structural advantages are achieved with respect to possible cabling as well as a shortened switching time in the control circuits, and thus an improved responsiveness of the control system 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a vehicle having an electronically actuated drive train, said control system comprising:
   a coordination level which is assigned to a system control device and in which setpoint values are generated from state variables of the vehicle and from driver's requests, and actuation signals for actuating actuators are generated based on the setpoint signals; and
   an execution level which is subordinate to the coordination level and which has actuators for executing the actuation signals; wherein,
   an axle electronic module for activating at least one brake actuator assigned to the chassis is arranged in proximity to a steerable vehicle axle;
   the axle electronic module is connected to the coordination level to receive setpoint values, and determines actuation signals for actuating respective axle actuators based on the setpoint values and input from one or more sensors which sense the vehicle's dynamic state;
   the axle electronic module is connected to an electronically actuated steering system for transmitting the actuation signals;
   the steering system comprises a steer-by-wire steering system and operates with a steering algorithm that can be modified as a function of the actuation signals; and
   an axle control device which is assigned to the execution level, is arranged in the region of the steerable vehicle axle, and contains the axle electronic module.

2. The control system according to claim 1, wherein the axle electronic module has sensors for sensing vehicle movement dynamic state variables when the vehicle corners, and activates at least one brake actuator of at least one vehicle brake if the state variables reach a predetermined value.

3. The control system according to claim 2, wherein the axle electronic module controls at least one of the at least one brake actuator and the controllable steering system, based on Kamm's Circle.

4. The control system according to claim 3, wherein the axle electronic module comprises at least one of electronics, software, and local control circuits for at least one of the following functions:
   braking;
   steering;
   additional drives; and
   ride level/pitch/roll control.

5. The control system according to claim 4, wherein at least one of the electronics, software, and local control circuit for the brakes controls at least one element from the following list:
   brake pressure;
   local ABS;
   ABS signal sensing and processing;
   active wear adjustment for a vehicle brake; and
   sensing brake lining wear.

6. The control system according to claim 5, wherein at least one of the electronics, software, and local control circuit has a local algorithm for at least one of a pitch function and roll function.

7. The control system according to claim 6, wherein the axle electronic module comprises at least one of electronics, software, and local control circuits for at least one element selected from the following group:
   tire management system including calculation of a coefficient of friction;
   tire pressure sensor; and
   axle-related actuators.

* * * * *